(12) United States Patent
Shu (10) Patent No.: US 9,665,187 B2
(45) Date of Patent: May 30, 2017

(54) COLOR INPUT DEVICE AND ITS APPLICATION KIT

(71) Applicant: UFRO LIMITED, Taipei (TW)

(72) Inventor: Jeremy-Pyu Shu, Taipei (TW)

(73) Assignee: UFRO LIMITED, Taipei (TW)

( * ) Notice: Subject to any disclaimer, the term of this patent is extended or adjusted under 35 U.S.C. 154(b) by 205 days.

(21) Appl. No.: 14/445,283

(22) Filed: Jul. 29, 2014

(65) Prior Publication Data

US 2016/0034052 A1 Feb. 4, 2016

(51) Int. Cl.
*G06F 3/0354* (2013.01)
(52) U.S. Cl.
CPC .................................. *G06F 3/03545* (2013.01)
(58) Field of Classification Search
CPC .................................................... G06F 3/03545
See application file for complete search history.

(56) References Cited

U.S. PATENT DOCUMENTS

| 5,610,629 A * | 3/1997 | Baur | G06F 3/0412 |
| | | | 345/104 |
| 2006/0087497 A1 | 4/2006 | Borgaonkar et al. | |
| 2010/0123688 A1* | 5/2010 | Lin | G06F 1/1626 |
| | | | 345/179 |
| 2014/0078109 A1* | 3/2014 | Armstrong-Muntner | G06F 3/03545 |
| | | | 345/175 |
| 2014/0084269 A1 | 3/2014 | Weaver et al. | |
| 2014/0253468 A1* | 9/2014 | Havilio | G06F 3/03545 |
| | | | 345/173 |

FOREIGN PATENT DOCUMENTS

| CN | 202742877 U | 2/2013 |
| CN | 103278243 A | 9/2013 |

* cited by examiner

*Primary Examiner* — Michael Faragalla
*Assistant Examiner* — Chayce Bibbee
(74) *Attorney, Agent, or Firm* — Pai Patent & Trademark Law Firm; Chao-Chang David Pai (57) ABSTRACT

A color input device includes a stylus, a color input unit installed in the stylus. The color input unit includes a circuit board, an MCU, a color sensor, a color display device, a Bluetooth module, a memory, a control interface and a power supply device respectively connected to the MCU. Through the control interface, the color sensor can be activated to capture nature colors and to store intake colors in the memory, and the colors stored in the memory can be displayed on the full color LED display and selected and transmitted to a computing device via the Bluetooth module, enabling the APP of the computing device to temporarily store the inputted colors and synchronously display them on the display device of the computing device. Furthermore, the color input device can receive colors or patterns from the computing device for establishing a diversified color database.

12 Claims, 6 Drawing Sheets

FIG. 10

COLOR INPUT DEVICE AND ITS APPLICATION KIT

BACKGROUND OF THE INVENTION (a) Field of the Invention

The present invention relates to color input technology, and more particularly to a color input device and its application kit applicable to tablet computers, laptop computers, smart phones or other computing devices for capturing colors from natural objects and storing captured colors in a memory therein and transmitting captured colors to the computing devices.

(b) Description of the Prior Art

Modern tablet computers, laptop computers, smart phones and other mobile computing devices commonly use a touch panel for data input. Data input can be done by means of clicking a finger or stylus on the touch panel. However, there are some deficiencies in using a finger to input data. So, there are developed many styluses with special features. For example, styluses capable of inputting colors are seen in US 20140078109, US 20140084269, US 20060087497, CN 202742877U, and CN 103278243A. According to these designs, the stylus has a color sensor mounted therein for capturing colors from natural objects and then transmitting captured color signals to a tablet computer or smart phone so that the tablet computer or smart phone can get specific colors.

However, conventional color sensor-equipped styluses or color pens are still not satisfactory in function. For example, these conventional color sensor-equipped styluses or color pens cannot capture vivid colors from the surfaces of natural objects in case of insufficient light. With respect to the concerns of how to store captured colors and how to transmit captured colors to a tablet computer or smart phone, conventional color sensor-equipped styluses or color pens cannot provide a definite answer. More particularly, when a user wishes to use a stylus as a color pen for drawing pictures on a tablet computer or smart phone and capturing colors from natural objects and establishing a color database in the tablet computer or stylus, the color sensor and the control interface for controlling the activation of the color sensor must be specially design so that the color sensor can capture more realistic colors from the surface of a natural object within the optical distance. Further, the operation of the color sensor of a stylus for children must be very convenient, so that children of all ages can easily get started. These are urgent issues to overcome.

SUMMARY OF THE INVENTION

The present invention has been accomplished under the circumstances in view. It is therefore the main object of the present invention to provide a color input device, which is capable of capturing colors from natural objects and storing captured colors in a built-in color database, and then transmitting color signals through a wireless transmission module thereof to a tablet computer, smart phone or other computing devices.

To achieve this and other objects of the present invention, a color input device comprises a stylus and a color input unit located at one end of the stylus. The color input unit comprises an MCU (micro controller unit), and a color sensor, a memory, a full color LED display, a first Bluetooth module, a control interface and a power supply device respectively electrically coupled to the MCU. The color sensor is adapted for capturing colors from natural objects. The memory is adapted for storing signals of colors captured by the color sensor. The full color LED display is adapted for displaying the colors captured by the color input unit and the colors stored in the memory. The first Bluetooth module is adapted for transmitting color signals to a computing device. The control interface is adapted for controlling the color sensor to capture or to stop capturing colors, and switching colors being displayed on the full color LED display. The power supply device is adapted to provide the necessary electrical energy.

The color input device of the present invention can be held by a user's one hand and directly pressed on the surface of any natural object to capture natural colors, avoiding interference of surrounding lights.

To achieve this and other objects of the present invention, a color input device comprises a stylus, a color input unit located at one end of the stylus, a tip located at an opposite end of the stylus, and an elastically bendable neck member connected between the stylus and the color input unit. The color input unit comprises a color sensor and a control interface located in one face thereof. Thus, a user can hold the stylus with one hand and freely bend the color input unit by means of the elastically bendable neck member to keep the color sensor and control interface in one face of the color input unit in direct contact with the surface of an object, enabling the control interface to drive the color sensor to capture colors, preventing the interference of surrounding light.

Another preferred embodiment of the present invention provides a color input device application kit, which enables a tablet computer, smart phone or other computing device to obtain and store colors from natural objects so that the computing device can establish a natural color database for use anytime.

To achieve this and other objects of the present invention, a color input device application kit of the invention comprises a color input device and a computing device. The color input device is the same as the aforesaid design. The computing device has built therein an arithmetic unit and a second Bluetooth module. The arithmetic unit can be a mobile APP (mobile application program). The second Bluetooth module is linkable to the first Bluetooth module of the color input device for receiving color signals, enabling the computing device to establish a natural color database.

DETAILED DESCRIPTION OF THE PREFERRED EMBODIMENTS

Figure 1:
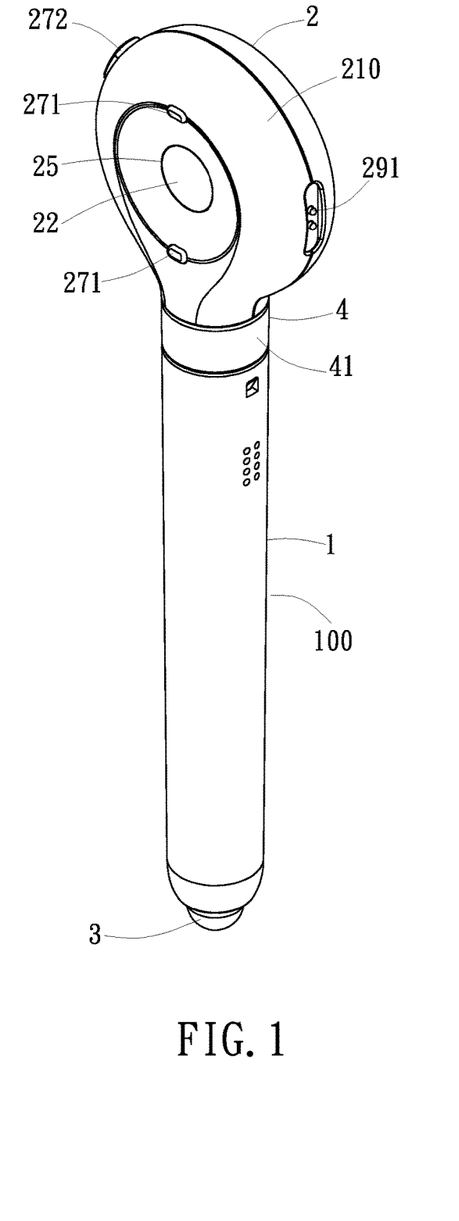
FIG. 1 is an oblique top elevational view of a color input device in accordance with the present invention.
Figure 2:
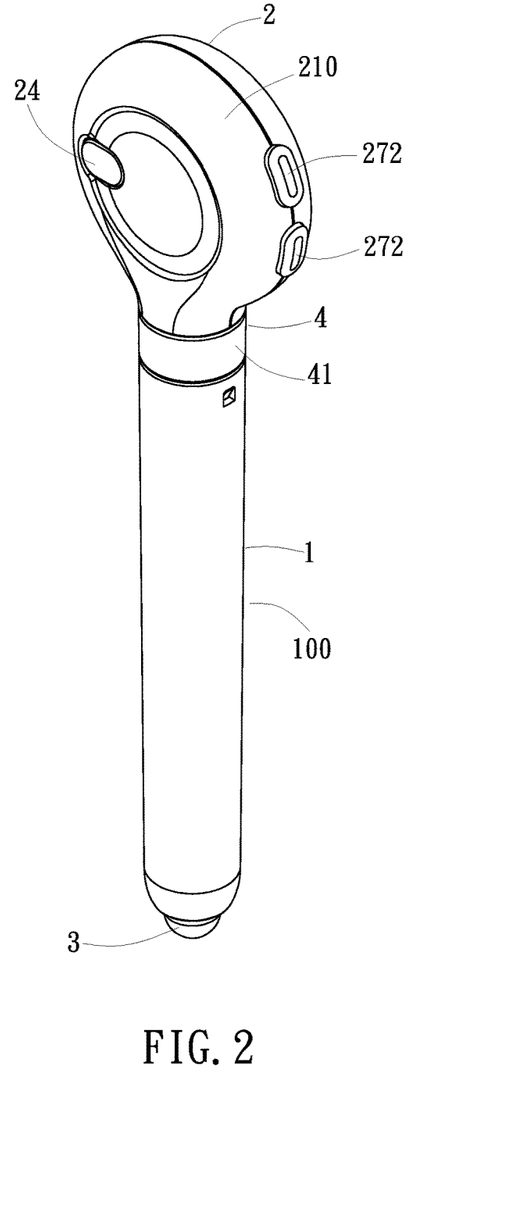
FIG. 2 corresponds to FIG. 1 when viewed from an opposite side.
Figure 10:
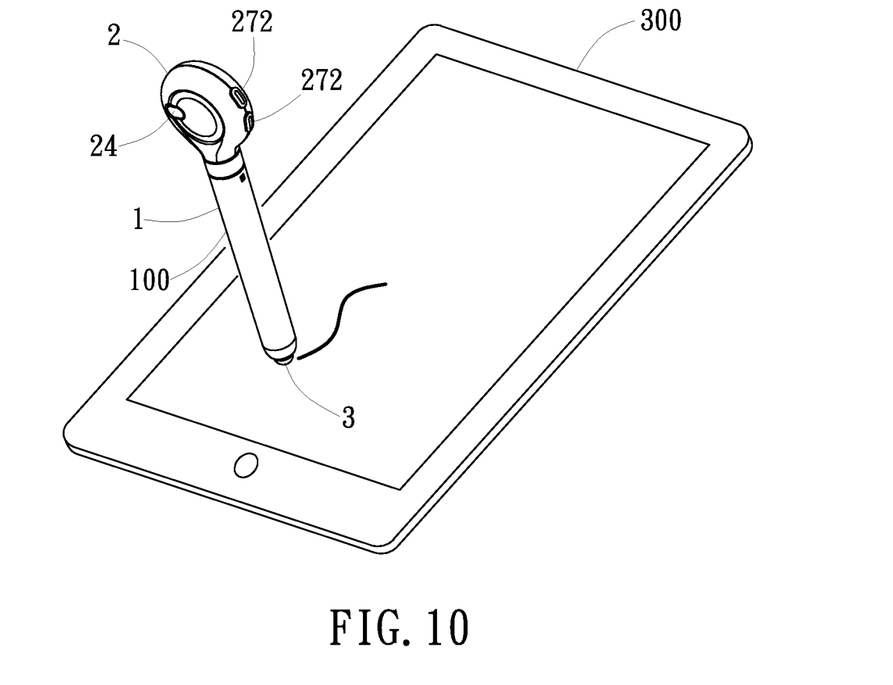
FIG. 10 is a schematic drawing illustrating a color input device application kit in accordance with the present invention.

Referring to FIG. 1, FIG. 2 and FIG. 10, a color input device and its application kit is applicable to a computing device 300 such as a tablet computer, a laptop computer or a smart phone, more particularly for use as an electronic color stylus for children. In one preferred embodiment of the present invention, the color input device 100 comprises a stylus 1, and a color input unit 2 mounted at one end of the stylus 1. The stylus 1 is a hollow cylindrical member made of an electrically conductive material, comprising a tip 3 located at one end thereof for touching a touchscreen of the computing device 300. The touchscreen of the computing device 300 can be a capacitive touchscreen or resistive touchscreen. The material of the tip 3 is selected to match with the capacitive touchscreen or resistive touchscreen.

Figure 3:
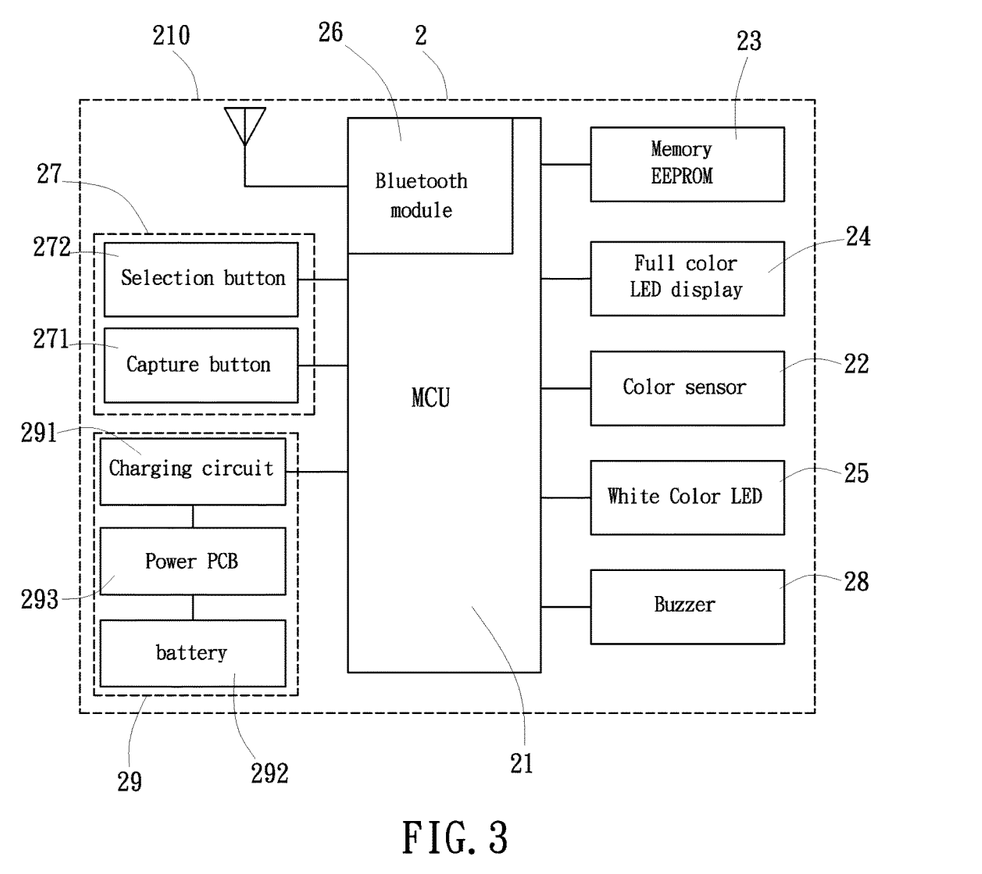
FIG. 3 is a system block diagram of the color input device in accordance with the present invention.
Figure 4:
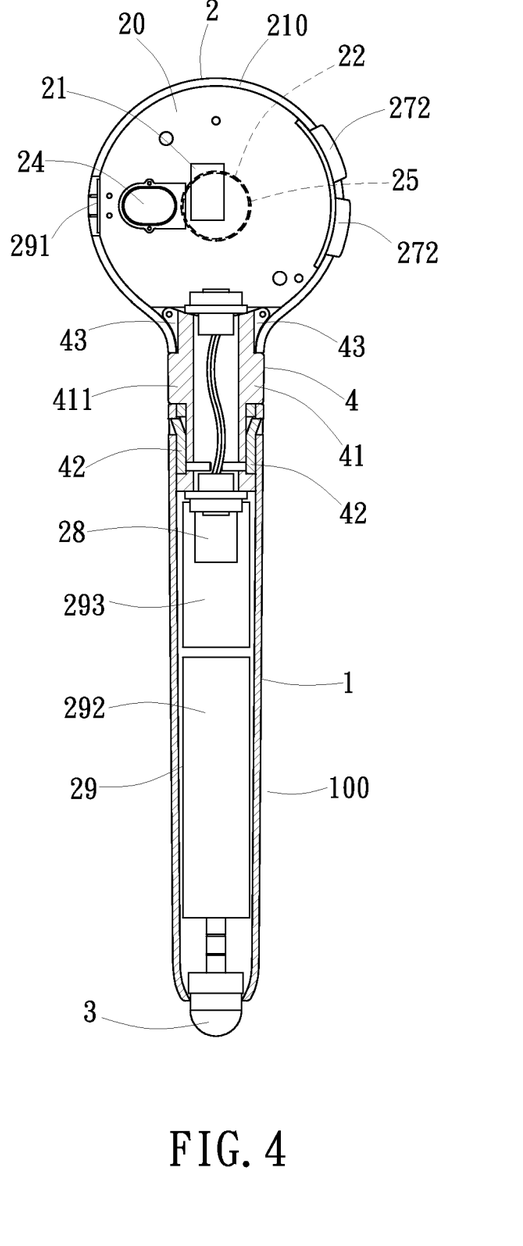
FIG. 4 is a schematic sectional side view of the color input device in accordance with the present invention.
Figure 6:
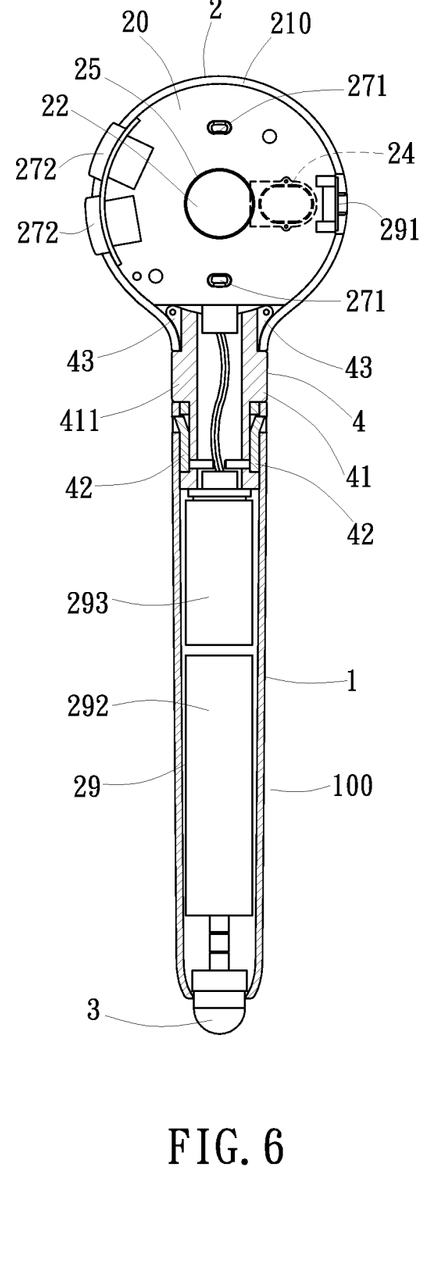
FIG. 6 corresponds to FIG. 4 when viewed from the opposite side.

Referring to FIG. 3, FIG. 4 and FIG. 6, the color input unit 2 comprises a circuit board 20, a micro controller unit (MCU) 21 installed in the circuit board 20, a color sensor 22, a memory 23, a full color LED display 24, a white color LED 25, a first Bluetooth module 26, a control interface 27, a buzzer 28 and a power supply device 29 installed in the circuit board 20 and respectively electrically coupled to the MCU 21.

Figure 7:
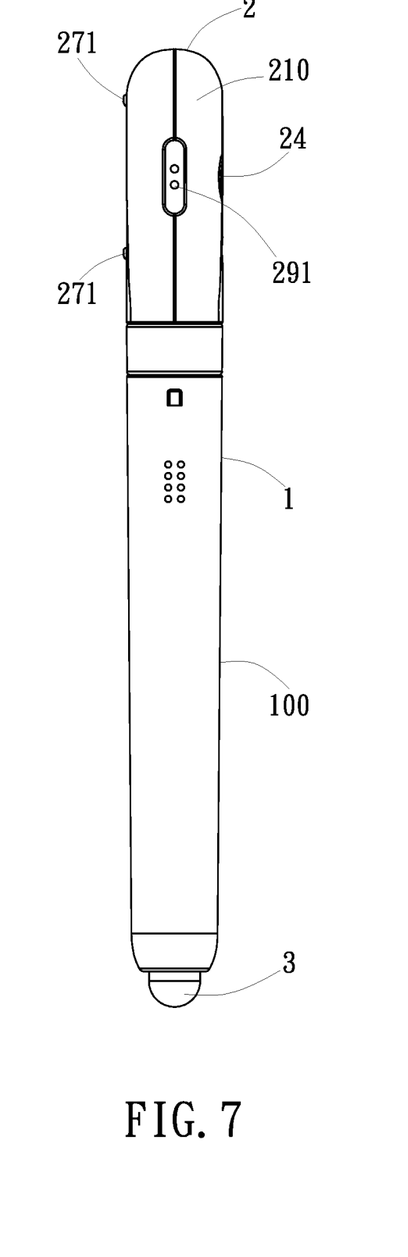
FIG. 7 is a lateral view of the color input device in accordance with the present invention.

The aforesaid memory 23 and first Bluetooth module 26 can be integrated into the MCU 21. The color sensor 22 is preferably a RGB color sensor for picking up natural colors at a short distance. The memory 23 is preferably an electrically-erasable programmable read-only memory (EEPROM). The memory 23 can also be directly built in the MCU 21 for storing color signals captured by the color sensor 22 for the establishment of a color database in the color input device of the present invention. The full color LED display 24 is preferably a RGB & white color LED adapted for displaying the colors being captured by the color sensor 22 at the real time, or the colors being read out from the memory by the user so that the user can confirm the selected colors. The white color LED 25 is preferably mounted at one side relative to the color sensor 22 or integrated with the color sensor 22 to form a module, and adapted to emit white light onto an object to reflect the colors of its surface so that the color sensor 22 can intake more realistic colors from the object. The first Bluetooth module 26 can be built in the MCU 21 or independently disposed outside the MCU 21 for transmitting each color signal obtained to the computing device 300. The control interface 27 preferably comprises at least one capture button 271 and at least one selection button 272. A sensor or any other control means can be used as a substitute. The capture button 271 is adapted for controlling the color sensor 22 to start and to stop capturing colors. The at least one selection button 272 is adapted for switching and selecting the colors being displayed on the full color LED display 24, and transmitting the color signals through the first Bluetooth module 26. The buzzer 28 is adapted for generating an alert sound or operating sound upon an error or other specific operations. The power supply device 29 is adapted for providing electrical energy to the aforesaid MCU and other functional components, comprising a charging circuit 291 (see FIG. 4 and FIG. 7), a battery 292 and a power PCB 293 (see FIG. 4 and FIG. 5) respectively electrically coupled to the MCU 21. The battery 292 is preferably a rechargeable battery (such as Li-ion battery).

Figure 5:
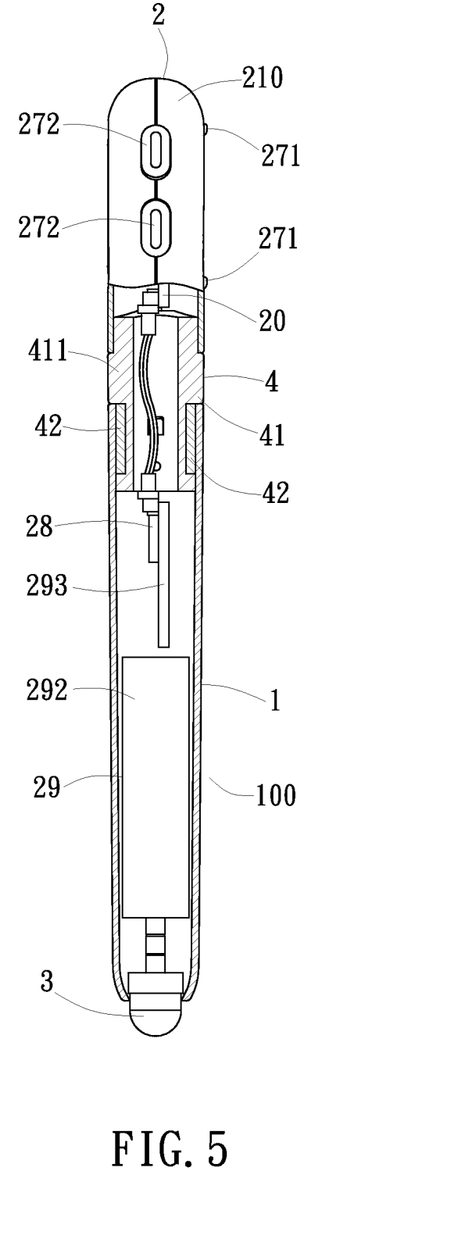
FIG. 5 is a schematic sectional lateral view of the color input device in accordance with the present invention.

Referring to FIG. 1, FIG. 4 and FIG. 5, the color input unit 2 preferably comprises a housing 210 joined to an opposite end of the stylus 1, and configured to house the aforesaid circuit board 20, the MCU 21, the color sensor 22 an other components that are installed in the circuit board 20, wherein the color sensor 22 and the capture button 271 are exposed to the outside of a first face of the housing 210 (see FIG. 1) so that the user can press the capture button 271 to drive the color sensor 22 to capture colors. The aforesaid full color LED display 24 is exposed to the outside of an opposing second face of the housing 210 (see FIG. 2) for enabling the user to view the captured colors. The number of the aforesaid at least one selection button 272 is preferably 2. The selection buttons 272 are located on the outside of one lateral side of the housing 210 (see FIGS. 2 and 5) and pressable by the user to select stored colors. The charging circuit 291 of the power supply device 29 is electrically coupled to the circuit board 20 and the power PCB 293, and exposed to the outside of an opposite lateral side of the housing 210 for enabling the user to charge the battery. The battery 292 and power PCB 293 of the power supply device 29 are preferably mounted within the stylus 1 and electrically coupled to the circuit board 20 to provide the necessary electrical energy.

The color input device of the present invention is particularly suitable for children. It can be used as an electronic color stylus applicable to a computing device 300 such as a tablet computer, laptop computer or smart phone. The invention also has an improved connection structure between the color input unit 2 and the stylus 1. As illustrated in FIG. 1 and FIG. 4, the aforesaid color input unit 2 is located at a first end of the stylus 1; the aforesaid tip 3 is located at an opposing second end of the stylus 1. Further, the invention provides an elastically bendable neck member 4 between the stylus 1 and the color input unit 2. The aforesaid color sensor 22 and at least one capture button 271 of the aforesaid control interface 27 are mounted in on one face of the color input unit 2.

Figure 9:
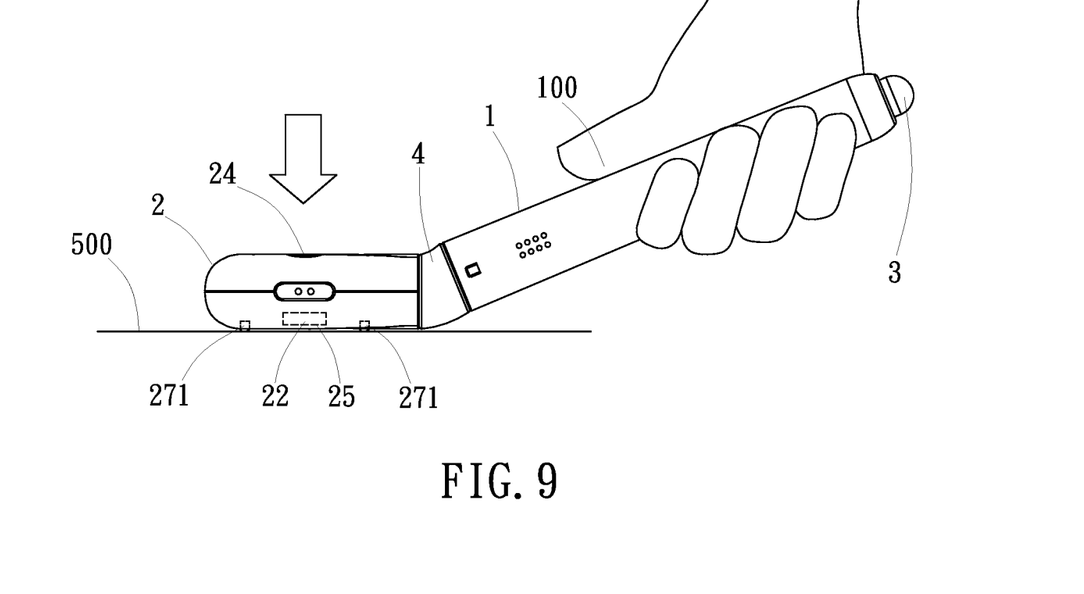
FIG. 9 is a schematic view of the color input device being applied in accordance with the present invention.

Thus, as shown in FIG. 9, through the elastically bendable neck member 4, a user can bend the color input unit 2. With the design of the positioning of the capture buttons 271 of the control interface 27, a user can hold the stylus 1 to directly attach the color input unit 2 to the surface of an object 500 to capture colors, keeping the color sensor 22 closer to the surface of the object 500, preventing surrounding color noises from interfering with the sensing of the color sensor 22 and enabling the capture buttons 271 to be pressed. At this time, the color sensor 22 is activated to capture colors, enabling the color signals fetched to be displayed on the full color LED display 24 and stored in the memory 23. Then, when the capture button 271 of the color input unit 2 is moved away from the surface of the object 500, the color sensor 22 is stopped from capturing colors.

Figure 8:
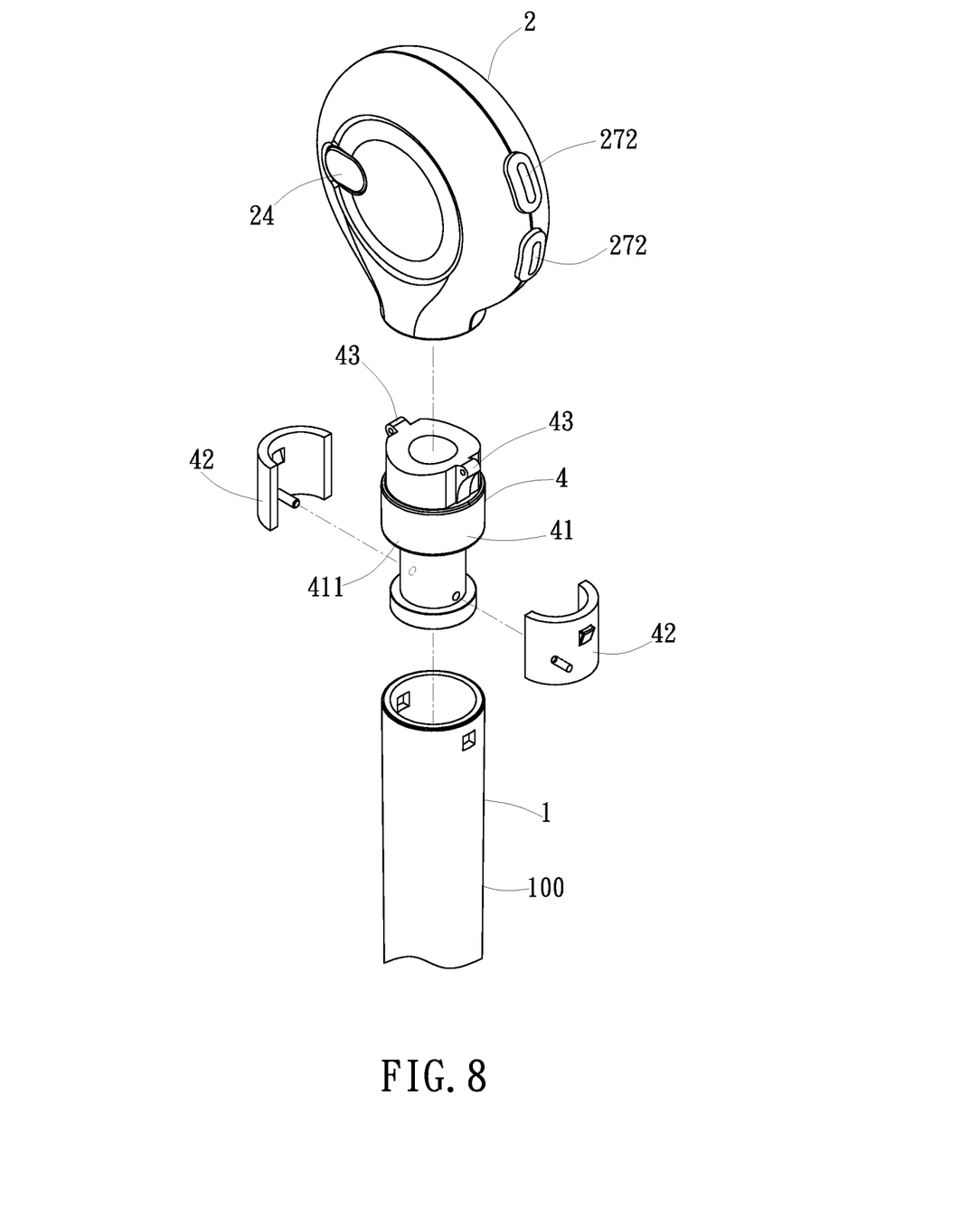
FIG. 8 is an exploded view of the color input device in accordance with the present invention.

Further, as shown in FIG. 6 and FIG. 8, the aforesaid neck member 4 is preferably an elastic member 41 that has its one end connected to the stylus 1 and its other end connected to the housing 210 of the color input unit 2. Preferably, the elastic member 41 comprises a shaft 411 made out of silicon rubber or rubber. One end of the shaft 411 is fastened to the stylus 1 by one or multiple fasteners 42. The other end of the shaft 411 has a plurality of hook blocks 43 fastened to the housing 210. Thus, the elastic member 41 is connected between the housing 210 of the color input unit 2 and the stylus 1, allowing the color input unit 2 to be bent.

Referring to FIG. 2 and FIG. 6, in order to let a user, particularly a child, to press the color input device on the surface of an object to further capture colors, the control interface 27 preferably provides two capture buttons 271 disposed outside the first face of the housing 210. Thus, as shown in FIG. 9, when the user holds the stylus 1 with one single hand and then presses the color input unit 2 on the surface of an object 500, the color sensor 22 will be activated only after the two capture buttons 271 have been completely pressed on the surface of the object 500. Through this operation mode, the color sensor 22 can be kept in proximity to the surface of the object 500 and the light emitted from the white color LED 25 can effectively reflect the colors of the surface of the object 500, enabling the color input device to capture more realistic colors from the object 500. Thus, the color input device of the present invention is suitable for users of all ages, particularly children. Because the invention adopts a direct uptake method to capture colors by direct contact, the invention simplifies the operation of the color input device, making the color input device capable of capturing vivid colors.

The color input device of the invention can be used as an electronic color stylus, particularly convenient for children. As illustrated in FIG. 9 and described above, a user can use the color input device to capture colors from the surface of an object 500 and to store captured colors in the memory 23 of the color input unit 2. When the color input device is used as an electronic color stylus, the user can press the selection buttons 272 to fetch color files from the memory 23 and to display fetched color files on the full color LED display 24 for selecting the desired colors. Thus, the user can freely fetch color files from the memory 2. When using the color input device with a tablet computer or any other computing device 300, the color input device can link to the Bluetooth module of the computing device 300 for synchronous color signal transmission to upload color files from the memory 23 to the computing device 300, or to download color files or patterns from the computing device 300 for storing in the memory 23 for further selection.

Referring to FIG. 10 again, a user, even a child, can use the color input device to draw pictures on a tablet computer or any other computing device 300. At this time, the selected color signal can be transmitted through the first Bluetooth module 26 to a second Bluetooth module (not shown) that is built in the computing device 300, enabling the computing device 300 to open the color files through an arithmetic unit. Thus, the user can draw on the computing device 300 the colors provided by the color input unit 2. The arithmetic unit of the computing device 300 is preferably a mobile APP. Through the application of the mobile APP, the color input device can be used with a computing device 300 (such as the aforesaid tablet computer or smart phone) to constitute an application kit without changing the hardware design of the computing device 300.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A color input device, comprising: a stylus, a color input unit, an elastically bendable neck member connected between said color input unit and one end of said stylus, and a tip disposed at an opposite end of said stylus, said color input unit comprising a housing, a micro controller unit (MCU), and a color sensor, a memory, a full color LED display, a first Bluetooth module, a control interface and a power supply device respectively electrically coupled to said MCU, said color sensor being adapted for capturing external colors, said memory being adapted for storing color signals captured by said color sensor, said full color LED display being adapted for displaying color signals, said first Bluetooth module being adapted for transmitting said color signals to an external computing device, said control interface being adapted for controlling said color sensor to start or stop capturing colors and switching color signals being displayed on said full color LED display, said power supply device being adapted to provide the color input device with necessary electrical energy, said tip being adapted for touching a touchscreen of said computing device, wherein said control interface comprises at least two capture buttons controllable to drive said color sensor to start or stop capturing colors, and at least one selection button adapted for switching color signals being displayed on said full color LED display, wherein said color sensor and said at least two capture buttons are exposed out of a first face of said housing; said full color LED display is exposed out of an opposing second face of said housing; and said at least one selection button is exposed out of one lateral side of said housing, wherein said color sensor starts capturing colors only when said at least two capture buttons have all been pressed on.

2. The color input device as claimed in claim 1, wherein said MCU has said first Bluetooth module and said memory integrated therein.

3. The color input device as claimed in claim 1, wherein said color input unit further comprises a white color LED electrically coupled to said MCU.

4. The color input device as claimed in claim 3, wherein said color input unit further comprises a circuit board mounted inside said housing; said MCU, said color sensor, said memory, said full color LED display, said first Bluetooth module and said at least two capture buttons and said at least one selection button of said control interface are installed on said circuit board; and said power supply device is mounted inside said stylus and electrically coupled to said circuit board.

5. The color input device as claimed in claim 4, wherein said power supply device comprises a charging circuit and a battery electrically coupled to said circuit board.

6. The color input device as claimed in claim 1, wherein the number of said at least one selection button is 2.

7. A color input device, comprising: a stylus, a color input unit, an elastically bendable neck member connected between said color input unit and one end of said stylus, and a tip located at an opposite end of said stylus, said color input unit comprising a housing, a color sensor and a control interface mounted in a first face of said control interface, said color sensor being adapted for capturing external colors, said control interface being adapted for activating said color sensor to capture colors and stopping said color sensor from capturing colors, wherein said control interface comprises at least two capture buttons controllable to drive said color sensor to start or stop capturing colors, and at least one selection button controllable to switch color signals being displayed on said full color LED display, wherein said color sensor and said at least two capture buttons are exposed out of a first face of said housing, wherein said color sensor starts capturing colors only when said at least two capture buttons have all been pressed on.

8. The color input device as claimed in claim 7, wherein said color input unit further comprises a circuit board mounted inside said housing, an MCU mounted on said circuit board and electrically coupled with said color sensor and said control interface, and a memory, a full color LED display and a first Bluetooth module respectively electrically coupled to said MCU, said memory being adapted for storing color signals captured by said color sensor, said full color LED display being adapted for displaying said color signals, said first Bluetooth module being adapted for transmitting said color signals to an external computing device.

9. The color input device as claimed in claim 8, wherein said full color LED display is exposed out of an opposing second face of said housing; and said at least one selection button is exposed out of one lateral side of said housing.

10. The color input device as claimed in claim 9, wherein the number of said at least one selection button is 2.

11. The color input device as claimed in claim 10, wherein said neck member is an elastic member connected between said stylus and said housing.

12. The color input device as claimed in claim 11, wherein said elastic member comprises a shaft made out of a plastic material, a fastening means fastening one end of said shaft to said stylus, and at least one hook block located at an opposite end of said shaft and fastened to said housing.

* * * * *